United States Patent Office 3,220,653
Patented Nov. 30, 1965

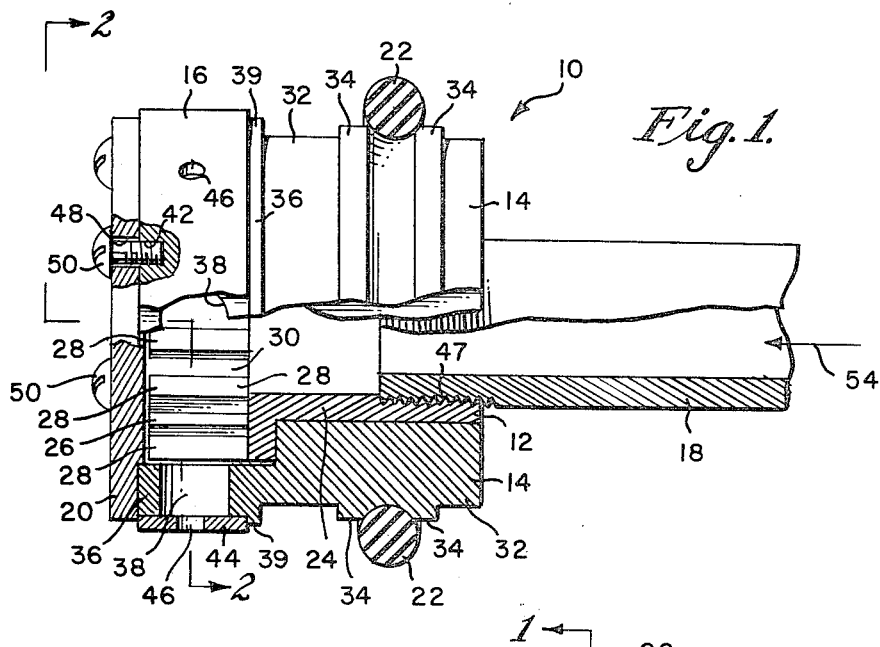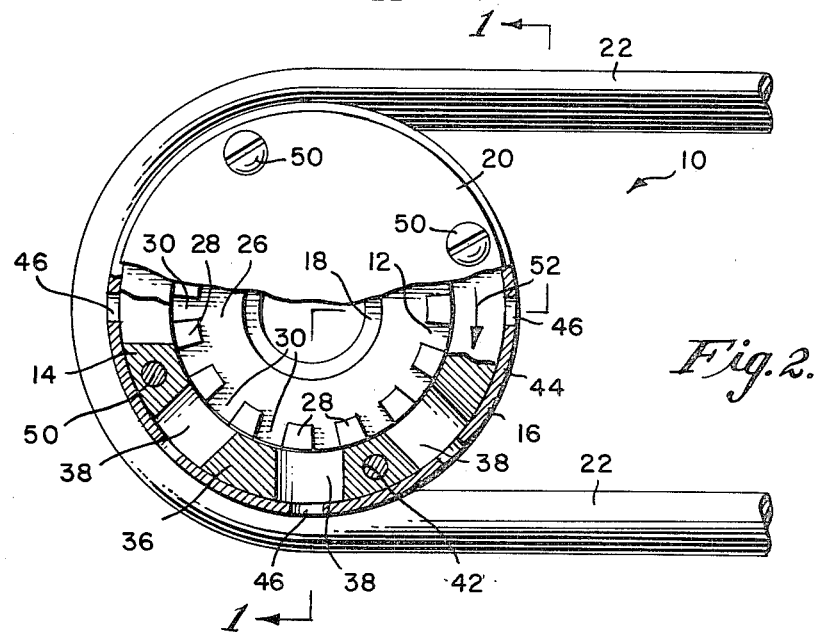

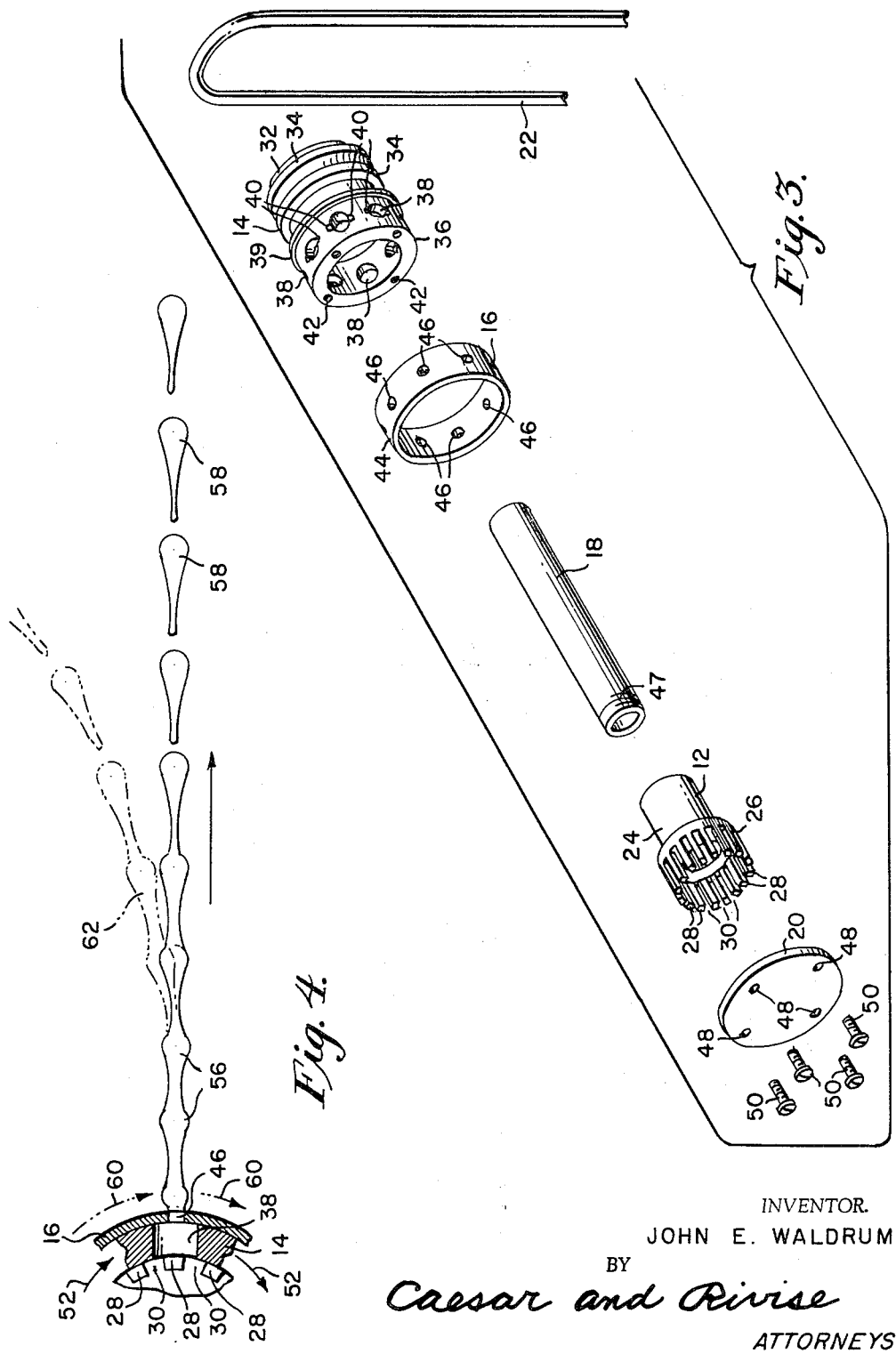

3,220,653
LIQUID SPRAYING DEVICE
John E. Waldrum, Ambler, Pa., assignor to Amchem Products, Inc., Ambler, Pa., a corporation of Delaware
Filed Aug. 22, 1963, Ser. No. 303,906
1 Claim. (Cl. 239—97)

This invention relates to a liquid spraying device and has as its objective the provision of a new and improved device of this general class.

The invention has particular application to a spray device for applying agricultural chemicals to a field and particularly relates to a spray device for use with relatively heavy, viscous liquids.

It is known to apply agricultural chemicals, such as herbicides, in the field by mechanisms generally known as mist applicators or cyclone applicators. Essentially such mechanisms include a fan, usually enclosed in a shroud, and an orifice for introducing the liquid to be sprayed into the air blast created by the fan. The fan is of a high velocity type, often generating blasts of air of 90 miles an hour or more.

The orifice for injecting the liquid to be sprayed into the air blast was heretofore usually either provided in the hub of the fan or a plurality of orifices was provided on the shroud in a position to inject the liquid into the air blast in the form of a stream.

The above mentioned systems were usually quite satisfactory for water-thin liquids; however, when relatively thick, viscous liquids were used, and particularly when such liquids had a tendency to work-harden, a considerable pumping force was necessary to get the liquids into the blast of air. In those cases where considerable thickening and hardening took place, such modes of application were found to be practically useless.

In order to overcome the foregoing problems, liquid spray devices of a different character were introduced. These are exemplified by Waldrum Patents No. 2,917,242 and No. 2,965,502. In Patent No. 2,917,242 the thick, viscous liquid was fed to a spinning recessed plate from which the liquid was discraged by centrifugal force through spray heads. In Patent No. 2,965,302 the thick viscous liquid was discharged from rotating nozzles into an air stream with laterally projecting blades adjacent the nozzles being positioned in the downstream path of airflow.

The foregoing devices have proved to be quite satisfactory. However, under certain applications it has been deemed desirable to apply the thick, viscous liquid as a stream of relatively uniform droplets with the ability to have some control with respect to the size and amplitude of the droplets.

It is therefore an object of the present invention to provide a liquid spray device which can handle thick, viscous liquids.

Another object of the present invention is to provide a spraying device which distributes thick, viscous liquids in the form of streams of relatively uniform droplets.

Yet another object of the present invention is to provide a liquid spray device which permits some control upon the size and amplitude of the droplets emerging from the device.

Still another object of the present invention is to provide a liquid spray device which imposes a pulsating signal on the stream emerging from the device.

The foregoing as well as other objects of the present invention are achieved by providing a liquid spraying device which basically comprises an inner stator, a rotor, generally telescoped about the stator, and a motor cover telescoped about the rotor. A stator support or inlet tube is provided which permits liquid under pressure to enter the stator. The stator has a plurality of teeth defining passageways between them in order to permit the liquid under pressure to depart from the stator by moving outwardly therefrom through the passageways. In so doing the liquid is chopped into segments.

The outwardly moving liquid is immediately forced to enter a compartment of the rotor which, in a first embodiment of the invention, is caused to revolve about its own axis by means of a driving belt. The liquid in the compartments of the rotor accordingly has a centrifugal force imposed thereon by virtue of the rotation of the rotor.

The liquid in the compartments of the rotor is forced outwardly from the rotor by virtue of the pressure of other incoming liquid and also because of the centrifugal force imposed thereon. The liquid leaving outwardly from the rotor may then emerge from the liquid spray device by passing through small openings provided in the fixed rotor cover which is telescoped about the rotor.

It has been found that the liquid will depart from the rotor cover in the form of a pulsating stream which quickly breaks up into droplets of a uniform size.

Other objects and many of the attendant advantages of the present invention will be readily appreciated as the same becomes better understood by reference to the following detailed description when considered in connection with the accompanying drawings wherein:

FIG. 1 is a side elevational view of the liquid spraying device of the present invention with portions thereof cut away for the sake of clarity to reveal in section certain internal elements of the device in accordance with the view taken along the lines 1—1 of FIG. 2;

FIG. 2 is a sectional view taken along the lines 2—2 of FIG. 1;

FIG. 3 is an exploded perspective view of the various elements constituting the device of FIGS. 1 and 2; and FIG. 4 is a schematic view partly in phantom generally illustrating the pulsating stream emerging from an opening in the rotor cover with the full line stream emerging when the rotor cover is stationary and the dashed line stream emerging where the rotor cover is caused to rotate.

Referring now to the various figures of the drawing wherein like reference numerals refer to like parts, there is shown in FIG. 1 a liquid spraying device 10 embodying the present invention. The various elements comprising the liquid spray device 10 are shown in detail in the exploded view of FIG. 3. Thus, the liquid spray device 10 comprises an inner stator 12, a rotor 14 which is generally telescoped about the stator 12 and a rotor cover 16 which is telescoped about the rotor 14. Other elements comprising the device 10 as illustrated in FIG. 3 are inlet tube 18, end cover 20 and driving belt 22.

The stator 12 basically comprises an elongated hollow cylindrical section 24 which widens out at its forward end into a head 26 which is comb-like in nature as it is comprised of circumferentially disposed teeth 28 which define passageways 30 between them. The cylindrical section 24 is internally threaded (FIG. 1) at its forward end in order to receive the threaded end of inlet tube 18.

The rotor 14 is adapted to be generally telescoped about the stator 12 and includes a rear hollow cylindrical run 32 having thereon a pair of parallel peripheral flanges 34 extending therefrom for purposes of defining a circumferential area to receive in a driving manner a portion of the driving belt 22.

Thus, the movement of the driving belt 22 causes the rotor 14 to revolve about its own axis. The rotor 14 further includes at its forward end an annular collar 36 of slightly greater inner and outer diameter having peripheral compartments or pressure chambers 38 extending therethrough so that liquid may flow from within the rotor 14 to a point outwardly of the rotor 14 by passing through the compartments 38.

It is to be noted that the compartments 38 are generally circular in nature but that they also include diametrically opposed notches 40 in order to enhance the flow pattern of the present invention. Also, the diameter of the openings 38 is considerably larger than the width of the passageways 30 in the stator 12 for purposes of developing the pulsating stream which emerges from the present spraying device.

The annular collar 36 also includes a plurality of openings 42 for use in attachment of the end cover 20 as well as a circumferential shoulder 39 which limits and aids in positioning the end cover 20.

The rotor cover 16 is annular in shape, having a cylindrical wall 44 with spaced openings 46 formed therein.

The inlet tube 18 is generally elongated and hollow for purposes of admitting liquid under pressure into the present spraying device. The forward end of the inlet tube 18 includes threads 46 which mate with the internal threads of section 24 of the stator 12 in order to connect the inlet tube 18 to the stator 12.

The end plate 20 is generally disc-shaped and possesses openings 48 therein which permit the passage of bolts 50 for engagement in threaded openings 42 of the rotor 14.

The belt 22 is adapted to contact the rotor 14 in the area between the flanges 34 as illustrated in FIG. 1. The belt 22 is driven by a motor (not shown) to which the belt 22 is connected in a well known manner.

The various elements of the present invention as illustrated in FIG. 3 with reference to FIGS. 1 and 2 may be assembled by first threading the inlet tube 18 into the bore of the section 24 of the stator 12.

The rotor 14 is then brought over inlet tube 18 and telescoped about the stator 12 by bringing it from behind the stator 12 so that the collar 36 of the rotor 14 is finally telescoped about the stator teeth 28 in a manner as illustrated in FIG. 2.

The rotor cover 16 is then telescoped about the rotor 14 by mounting the rotor cover 16 from a front-ward direction backwardly until the rear edge of the rotor cover 16 abuts against shoulder 39 of the rotor 14. The end plate 20 is then applied against the rotor cover 16 with the openings 48 of the end plate 20 being aligned with the openings 42 in the rotor head 36. With the insertion of the bolts 50 the assembly is completed by the securement of the belt 22 between the flanges 34 of the rotor 14, and the rotor 14 may rotate with respect to other elements of the present invention. If necessary, appropriate bearings may be added.

In operation the belt 22 is caused to move in a given sense by means of a motor (not shown). By virtue of the engagement of the belt 22 upon the rotor 14, the rotor 14 is caused to rotate in a given direction, such as, a clockwise direction as indicated by the arrows 52 of FIGS. 2 and 4.

In the preferred embodiment of the invention, the rotor 14 will rotate and the end plate 20 will be carried along with it. A thick, viscous liquid is pumped forwardly under pressure in the direction of arrows 54 of FIG. 1 into inlet tube 18. From inlet tube 18 the liquid passes internally of section 24 of fixed stator 12 and then into the comb-like head 26 of the stator 12. As the liquid is under pressure it will move outwardly of the stator through passageways 30 of the stator head 26 and into the compartments 38 of the revolving rotor 14 whenever a compartment 38 of the revolving rotor communicates with an opening 30.

Once the liquid is in one of the compartments 38 it has a tendency to move outwardly therefrom by virtue of the centrifugal force of revolution of the rotor 14 and also by virtue of the pressure of other liquid moving outwardly from the stator 12 and into the compartments 38. The liquid may move outwardly of compartments 38 whenever a compartment 38 communicates with an opening 46 in the rotor cover 16.

As illustrated in FIG. 4 the stream emerging from an opening 46 has a signal imposed upon it, such that it is pulsating and is comprised of nodules 56 which soon break up into uniform droplets 58.

It can be seen that the signal imposed upon the emerging stream can be increased in amplitude by increasing the rate of revolution of the rotor 14. Furthermore, the stator 12 may be rotated and the rotor 14 fixed by adaptation of the belt 22 to the stator 12.

The size and nature of the droplets 58 may be further modified by varying the size, shape and spacing of the various openings, such as, the passageways 30, the compartments 38 and the openings 46.

However, it is preferred that the compartments 38 be relatively large as compared with the passageways 30 and the openings 46. In this manner the liquid will be chopped into segments by the stator 12 and will enter the compartment 38 at a varying rate as a compartment 38 moves past an opening 30. The liquid will leave the compartment 38 at predetermined intervals but at a uniform rate inasmuch as the openings 46 are small relative to the size of the compartment 38.

It is thus seen that the spray device of the present invention is quite effective for spraying thick, viscous liquids. The present device possesses various means to provide a tortuous path through which the liquid must travel and also possesses a revolvable member which together with the other features of the invention functions to impose a pulsating signal upon the stream emerging from the present device. Furthermore, for certain applications, it may be desirable to rotate the stator while holding the rotor stationary or to rotate the rotor cover and the stator while holding the rotor fixed. Should the rotor cover be rotated in the direction of the dashed arrow 60 of FIG. 4, the emerging pulsating stream 62 will tend to curve in a counterclockwise arc by virtue of the centrifugal force imparted to the stream as it emerges from the rotor cover.

Obviously many modifications and variations of the present invention are possible in the light of the above teachings. It is, therefore, to be understood that within the scope of the appended claim, the invention may be practiced otherwise than as specifically described.

What is claimed as the invention is:

A liquid spraying device comprising a stationary inner stator, a rotor generally telescoped about the stator and a rotor cover telescoped about the rotor, the stator being comprised of an elongated hollow section which includes a head that is comb-like and has a plurality of teeth defining a plurality of orifices, the rotor being revolvable about its own axis and including a plurality of compartments to receive and discharge liquid therefrom, the rotor cover including openings which are small relative to said orifices and said compartments, said compartments being substantially larger than said orifices and rotor cover openings, said orifices, compartments, and openings being adapted to communicate with each other, means to supply liquid under pressure to said stator, driving means including a driving belt associated with said rotor to revolve said rotor between said stator and rotor cover, the liquid stream emerging from said rotor cover being in the form of a pulsating stream which quickly breaks up into droplets of relatively uniform size.

References Cited by the Examiner

UNITED STATES PATENTS

| | | | |
|---|---|---|---|
| 2,103,887 | 12/1937 | Bowen et al. | 239—223 |
| 2,333,150 | 11/1943 | Bowen | 239—223 |
| 2,473,035 | 6/1949 | Meade et al. | 239—224 |
| 2,815,246 | 12/1957 | Nyrop | 239—223 |
| 3,103,311 | 9/1963 | Kempf | 239—222 |

EVERETT W. KIRBY, *Primary Examiner.*